US012597784B2

(12) United States Patent
Guo et al.

(10) Patent No.: US 12,597,784 B2
(45) Date of Patent: Apr. 7, 2026

(54) POWER SUPPLY CIRCUIT WITH SHORT CIRCUIT PROTECTION

(71) Applicant: QUALCOMM Incorporated, San Diego, CA (US)

(72) Inventors: Guoyong Guo, San Jose, CA (US); Neal Horovitz, Los Altos, CA (US); Jonathan Luty, San Diego, CA (US); Kin Siu Fung, San Jose, CA (US); Daryl Bergstrom, Chandler, AZ (US)

(73) Assignee: Qualcomm Incorporated, San Diego, CA (US)

( * ) Notice: Subject to any disclaimer, the term of this patent is extended or adjusted under 35 U.S.C. 154(b) by 36 days.

(21) Appl. No.: 18/441,885

(22) Filed: Feb. 14, 2024

(65) Prior Publication Data

US 2025/0260247 A1 Aug. 14, 2025

(51) Int. Cl.
H02J 7/00 (2006.01)
H02M 1/32 (2007.01)
H02M 3/158 (2006.01)

(52) U.S. Cl.
CPC ........ H02J 7/0031 (2013.01); H02J 7/00712 (2020.01); H02M 1/32 (2013.01); H02M 3/158 (2013.01)

(58) Field of Classification Search
CPC .... H02J 7/007; H02J 7/00712; H02J 7/00714; H02J 7/0031; H02J 7/0029;
(Continued)

(56) References Cited

U.S. PATENT DOCUMENTS 6,100,677 A 8/2000 Farrenkopf
6,137,190 A 10/2000 Gatti
(Continued)

FOREIGN PATENT DOCUMENTS

CN 102957126 A 3/2013
WO 2021016157 A1 1/2021

OTHER PUBLICATIONS

Robert Keim, "The Basic MOSFET Differential Pair", Jun. 9, 2016, retrieved from https://www.allaboutcircuits.com/technical-articles/the-basic-mosfet-differential-pair/ on May 16, 2025 (Year: 2016).*
(Continued)

*Primary Examiner* — Ryan Johnson
(74) *Attorney, Agent, or Firm* — Patterson & Sheridan LLP

(57) ABSTRACT

Certain aspects of the present disclosure provide techniques and apparatus for supplying power, including short circuit protection. One example power supply circuit generally includes a switching regulator including an output coupled to a first power supply node, a battery node for coupling to a battery, a switch coupled between the first power supply node and the battery node, a first transistor including a gate coupled to the first power supply node and a source coupled to a reference potential node of the power supply circuit, and a first current source or a resistive element, coupled between a power supply rail and a drain of the first transistor. The power supply circuit may be configured to detect a short circuit on the first power supply node and trigger an automatic fault protection (AFP) mode after completion of a soft start of a voltage on the first power supply node.

16 Claims, 7 Drawing Sheets

(58) Field of Classification Search
 CPC ...... H02J 7/00304; H02M 1/32; H02M 3/158;
 H02H 3/24; H02H 3/243
 See application file for complete search history.

(56) References Cited

U.S. PATENT DOCUMENTS

| | | | |
|---|---|---|---|
| 2016/0118822 A1* | 4/2016 | Gurlahosur | H02J 7/0071 |
| | | | 320/162 |
| 2019/0265739 A1 | 8/2019 | Kuroda et al. | |
| 2022/0077775 A1 | 3/2022 | Chien | |
| 2022/0231518 A1 | 7/2022 | Kun et al. | |
| 2023/0142751 A1 | 5/2023 | Cho et al. | |

OTHER PUBLICATIONS

Co-pending U.S. Appl. No. 18/545,729, filed Dec. 19, 2023.
International Search Report and Written Opinion—PCT/US2025/
011354—ISA/EPO—May 13, 2025.

\* cited by examiner

500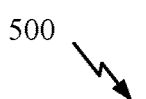

502

After completion of a soft start of a voltage of a first power supply node coupled to an output of a switching regulator and coupled to a battery node via a switch, enable a detection mode

504

When, during the enabled detection mode, the voltage of the first power supply node is less than a threshold voltage ($V_{th}$) of a first transistor including a gate coupled to the first power supply node, trigger an automatic fault protection (AFP) mode

FIG. 5

POWER SUPPLY CIRCUIT WITH SHORT CIRCUIT PROTECTION

TECHNICAL FIELD

Certain aspects of the present disclosure generally relate to power supply circuits and, more particularly, to techniques and apparatus for providing short circuit protection.

BACKGROUND

A voltage regulator ideally provides a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator (also known as a "switching converter" or "switcher") may be implemented, for example, by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches are typically implemented with transistors, although the low-side switch may alternatively be implemented with a diode.

A charge pump is a type of SMPS typically comprising at least one switching device to control the connection of a supply voltage across a load through a capacitor. In a voltage doubler (also referred to as a "multiply-by-two (×2) charge pump"), for example, the capacitor of the charge pump circuit may initially be connected across the supply, charging the capacitor to the supply voltage. The charge pump circuit may then be reconfigured to connect the capacitor in series with the supply and the load, doubling the voltage across the load. This two-stage cycle is repeated at the switching frequency for the charge pump. Charge pumps may be used to multiply or divide voltages by integer or fractional amounts, depending on the circuit topology.

Power management integrated circuits (power management ICs or PMICs) are used for managing the power scheme of a host system and may include and/or control one or more voltage regulators (e.g., buck converters or charge pumps). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features are discussed briefly below. After considering this discussion, and particularly after reading the section entitled "Detailed Description," one will understand how the features of this disclosure provide the advantages described herein.

Certain aspects of the present disclosure provide a power supply circuit. The power supply circuit generally includes a switching regulator including an output coupled to a first power supply node, a battery node for coupling to a battery, a switch coupled between the first power supply node and the battery node, a first transistor including a gate coupled to the first power supply node and a source coupled to a reference potential node of the power supply circuit, and a first current source or a resistive element, coupled between a power supply rail and a drain of the first transistor.

Certain aspects of the present disclosure provide a power supply circuit. The power supply circuit generally includes a switching regulator including an output coupled to a power supply node, a battery node for coupling to a battery, a switch coupled between the power supply node and the battery node, and a logic circuit coupled to the power supply node and configured to detect a short circuit on the power supply node, after completion of a soft start of a voltage on the power supply node.

Certain aspects of the present disclosure are directed to a method of supplying power. The method generally includes after completion of a soft start of a voltage of a first power supply node coupled to an output of a switching regulator and coupled to a battery node via a switch, enabling a detection mode, and when, during the enabled detection mode, the voltage of the first power supply node is less than a threshold voltage ($V_{th}$) of a first transistor including a gate coupled to the first power supply node, triggering an automatic fault protection (AFP) mode.

Certain aspects of the present disclosure provide an integrated circuit (e.g., a power management integrated circuit (PMIC)) comprising at least a portion of any of the power supply circuits described above.

Certain aspects of the present disclosure provide a battery charging circuit comprising any of the power supply circuits described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5 is a flow diagram of example operations for supplying power, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
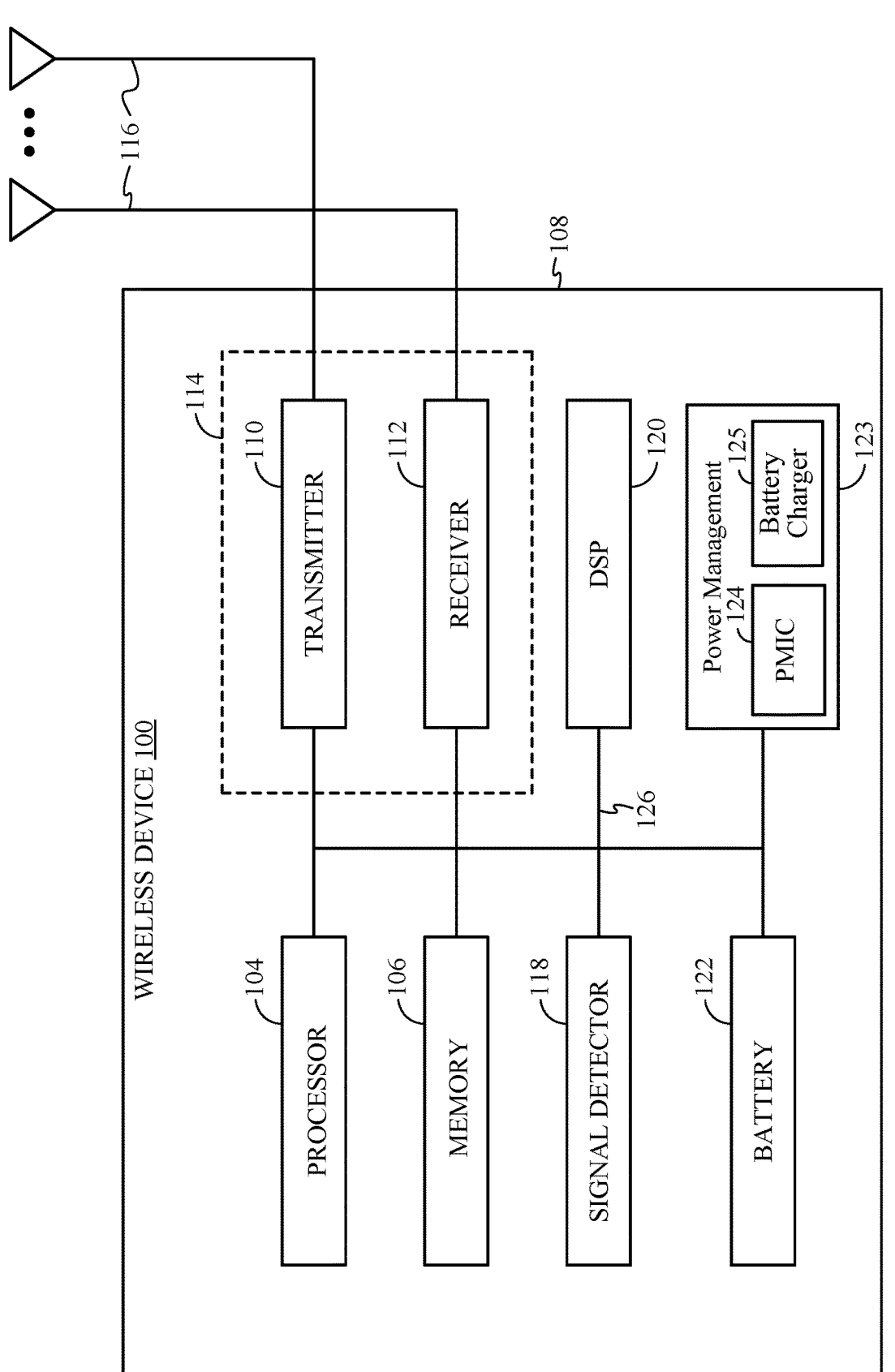
FIG. 1 is a block diagram of an example device comprising a power management system that includes a power management integrated circuit (PMIC) and a battery charging circuit, in which aspects of the present disclosure may be practiced.

Certain aspects of the present disclosure provide techniques and apparatus for providing short circuit protection in a power supply circuit. Such a power supply circuit may be configured to detect a short circuit on a power supply node included in the power supply circuit and trigger an automatic fault protection (AFP) mode after completion of a soft start of a voltage on the power supply node.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, an Internet of things (IoT) device, a wearable device, an augmented reality device, etc. For certain aspects, the device 100 may be a foldable device (e.g., a flip phone).

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a transmitter 110 and/or a receiver 112 to allow transmission and/or reception, respectively, of data between the device 100 and a remote location. For certain aspects, the transmitter 110 and receiver 112 may be combined into a transceiver 114. One or more antennas 116 may be attached or otherwise coupled to a housing 108 of the device 100 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122, which may be used to power the various components of the device 100 (e.g., when another power source—such as a wall adapter or a wireless power charger—is unavailable). The battery 122 may comprise a single cell or multiple cells connected in series and/or in parallel. The device 100 may further include additional independent batteries (not shown). Each of the additional independent batteries may comprise a single cell or multiple cells connected in series and/or in parallel.

The device 100 may also include a power management system 123 for managing the power from the battery 122 (or batteries), a wall adapter, and/or a wireless power charger to the various components of the device 100. The power management system 123 may perform a variety of functions for the device such as DC-to-DC conversion, battery charging, power-source selection, voltage scaling, power sequencing, source mode power, etc. In certain aspects, the power management system 123 may include a power management integrated circuit (power management IC or PMIC) 124 and one or more power supply circuits, such as a battery charger 125, which may be controlled by the PMIC or logic associated with the battery charger, for example. For certain aspects, at least a portion of one or more of the power supply circuits (e.g., at least a portion of the battery charger 125) may be integrated in the PMIC 124. The PMIC 124 and/or the one or more power supply circuits may include at least a portion of a switched-mode power supply (SMPS) circuit, which may be implemented by any of various suitable switched-mode power supply circuit topologies, such as a two-level buck converter, a three-level buck converter, a charge pump, or an adaptive combination power supply circuit (e.g., the SMPS circuit 214 of FIG. 2), which can switch between operating in a buck converter mode and a charge pump mode, as described below.

The various components of the device 100 may be coupled together by a bus system 126, which may include a power bus, a control signal bus, and/or a status signal bus in addition to a data bus. Additionally or alternatively, various combinations of the components of the device 100 may be coupled together by one or more other suitable techniques.

Example Power Supply Circuits and Operation

As described above, the PMIC 124 and/or the one or more power supply circuits (e.g., battery charger 125) may include at least a portion of an SMPS circuit (e.g., a buck converter, a charge pump converter, or an adaptive combination power supply circuit capable of switching therebetween), which may be a single-phase or multi-phase converter. In the case of an adaptive combination power supply circuit, both converter modes may be single-phase, both converter modes may be multi-phase, one converter mode may be single-phase while the other converter mode is multi-phase or capable of changing between single-phase and multi-phase, or one converter mode may be multi-phase while the other converter mode is capable of changing between single-phase and multi-phase.

Figure 2:
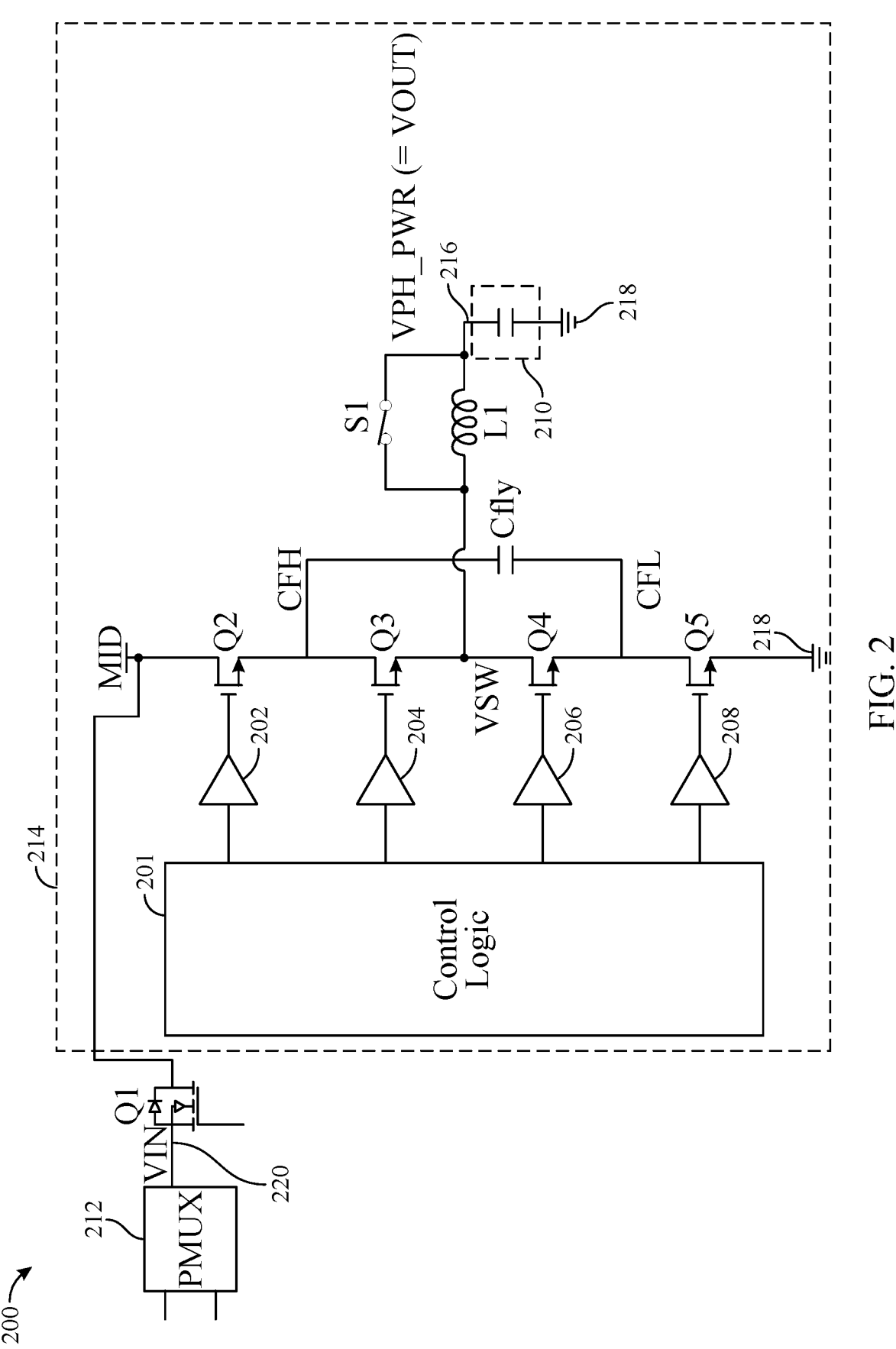
FIG. 2 is a circuit diagram of an example power supply circuit, in accordance with certain aspects of the present disclosure.

FIG. 2 is a circuit diagram of an example power supply circuit 200, which may be used to charge one or more batteries. As illustrated, the power supply circuit 200 includes a power multiplexer 212 (labeled "PMUX"), a reverse-current-blocking transistor Q1 (which may also be referred to as an overvoltage protection (OVP) field-effect transistor (FET) or an input FET), and an SMPS circuit 214 (e.g., an adaptive SMPS circuit).

The power multiplexer 212 may be configured to select between receiving power from, for example, (i) a Universal Serial Bus (USB) port for connecting to a wall adapter and (ii) a wireless power port (both not shown). The power multiplexer 212 may be implemented as a single-pole, double-throw (SPDT) switch by two OVP FETs, and in this case, transistor Q1 may be eliminated.

In certain aspects, the output of the power multiplexer 212 may be coupled to an input voltage node 220 (labeled "VIN"). The input voltage node 220 may be coupled to a source of the transistor Q1, and a drain of the transistor Q1 may be coupled to a voltage node (labeled "MID") of the SMPS circuit 214. The MID voltage node may serve as the power supply rail of the SMPS circuit 214, and in some cases, may alternatively be considered as an input node of the SMPS circuit. In some cases, the power multiplexer 212 and/or transistor Q1 may be removed.

For certain aspects, the SMPS circuit 214 may have a two-level buck converter topology. For other aspects, the SMPS circuit 214 may have a single-phase three-level buck converter topology (as illustrated in the power supply circuit 200 of FIG. 2), and may include a second transistor Q2, a third transistor Q3, a fourth transistor Q4, a fifth transistor Q5, a flying capacitive element Cfly, an inductive element L1, and a load 210, which is represented here by a capacitor. For other aspects, the SMPS circuit 214 may have a dual-phase three-level buck converter topology. To realize an adaptive SMPS circuit, a switch S1 may be added across the inductive element L1 of the three-level buck converter topology. With the switch S1 closed, the adaptive SMPS circuit may function as a single-phase divide-by-two (Div2) charge pump converter, as further described below. In certain aspects, switch S1 may be implemented by two back-to-back transistors.

Transistor Q3 may be coupled to transistor Q2 via a first node (labeled "CFH" for flying capacitor high node), transistor Q4 may be coupled to transistor Q3 via a second node (labeled "VSW" for voltage switching node), and transistor Q5 may be coupled to transistor Q4 via a third node (labeled "CFL" for flying capacitor low node). For certain aspects, the transistors Q2-Q5 may be implemented as n-type metal-oxide-semiconductor (NMOS) transistors, as illustrated in FIG. 2. In this case, the drain of transistor Q3 may be coupled to the source of transistor Q2, the drain of transistor Q4 may be coupled to the source of transistor Q3, and the drain of transistor Q5 may be coupled to the source of transistor Q4. The source of transistor Q5 may be coupled to a reference potential node 218 (e.g., electric ground) for the power supply circuit 200. The flying capacitive element Cfly may have a first terminal coupled to the first node and a second terminal coupled to the third node. The inductive element L1 may have a first terminal coupled to the second node and a second terminal coupled to an output voltage node 216 (labeled "VOUT," which may also be referred to as "VPH_PWR" or "VPH") and the load 210.

Control logic 201 may control operation of the SMPS circuit 214 and other aspects of the power supply circuit 200. For example, the control logic 201 may control operation of the transistors Q2-Q5 via output signals to the inputs of respective gate drivers 202, 204, 206, and 208. The outputs of the gate drivers 202, 204, 206, and 208 are coupled to respective gates of transistors Q2-Q5. During operation of the adaptive SMPS circuit (or of a three-level buck converter), the control logic 201 may cycle through four different phases, which may differ depending on whether the duty cycle is less than 50% or greater than 50%.

Operation of the adaptive SMPS circuit with a duty cycle of less than 50% is described first. In a first phase (referred to as a "charging phase"), transistors Q2 and Q4 are activated, and transistors Q3 and Q5 are deactivated, to charge the flying capacitive element Cfly and to energize the inductive element L1. In a second phase (called a "holding phase"), transistor Q2 is deactivated, and transistor Q5 is activated, such that the VSW node is coupled to the reference potential node, the flying capacitive element Cfly is disconnected (e.g., one of the Cfly terminals is floating), and the inductive element L1 is deenergized. In a third phase (referred to as a "discharging phase"), transistors Q3 and Q5 are activated, and transistor Q4 is deactivated, to discharge the flying capacitive element Cfly and to energize the inductive element L1. In a fourth phase (also referred to as a "holding phase"), transistor Q4 is activated, and transistor Q3 is deactivated, such that the flying capacitive element Cfly is disconnected and the inductive element L1 is deenergized.

Operation of the adaptive SMPS circuit with a duty cycle greater than 50% is similar in the first and third phases, with the same transistor configurations. However, in the second phase (called a "holding phase") following the first phase, transistor Q4 is deactivated, and transistor Q3 is activated, such that the VSW node is coupled to the MID node, the flying capacitive element Cfly is disconnected, and the inductive element L1 is energized. Similarly in the fourth phase (also referred to as a "holding phase") with a duty cycle greater than 50%, transistor Q2 is activated, and transistor Q5 is deactivated, such that the flying capacitive element Cfly is disconnected and the inductive element L1 is energized.

Furthermore, the control logic 201 may have a control signal (not shown in FIG. 2) configured to control operation of switch S1 and selectively enable divide-by-two (Div2) charge pump operation. For certain aspects, when this control signal is logic low, switch S1 is open, and the power supply circuit 200 operates as a three-level buck converter using the inductive element L1. When this control signal is logic high for certain aspects, switch S1 is closed, thereby shorting across the inductive element L1 and effectively removing the inductive element L1 from the circuit, such that the adaptive SMPS circuit operates as a Div2 charge pump. The control logic 201 may be configured to automatically control operation of switch S1 (e.g., through the logic level of the control signal) based on an output current (also referred to as a "load current") and/or an input current for the adaptive SMPS circuit.

Example Power Supply Circuit

Figure 3A:
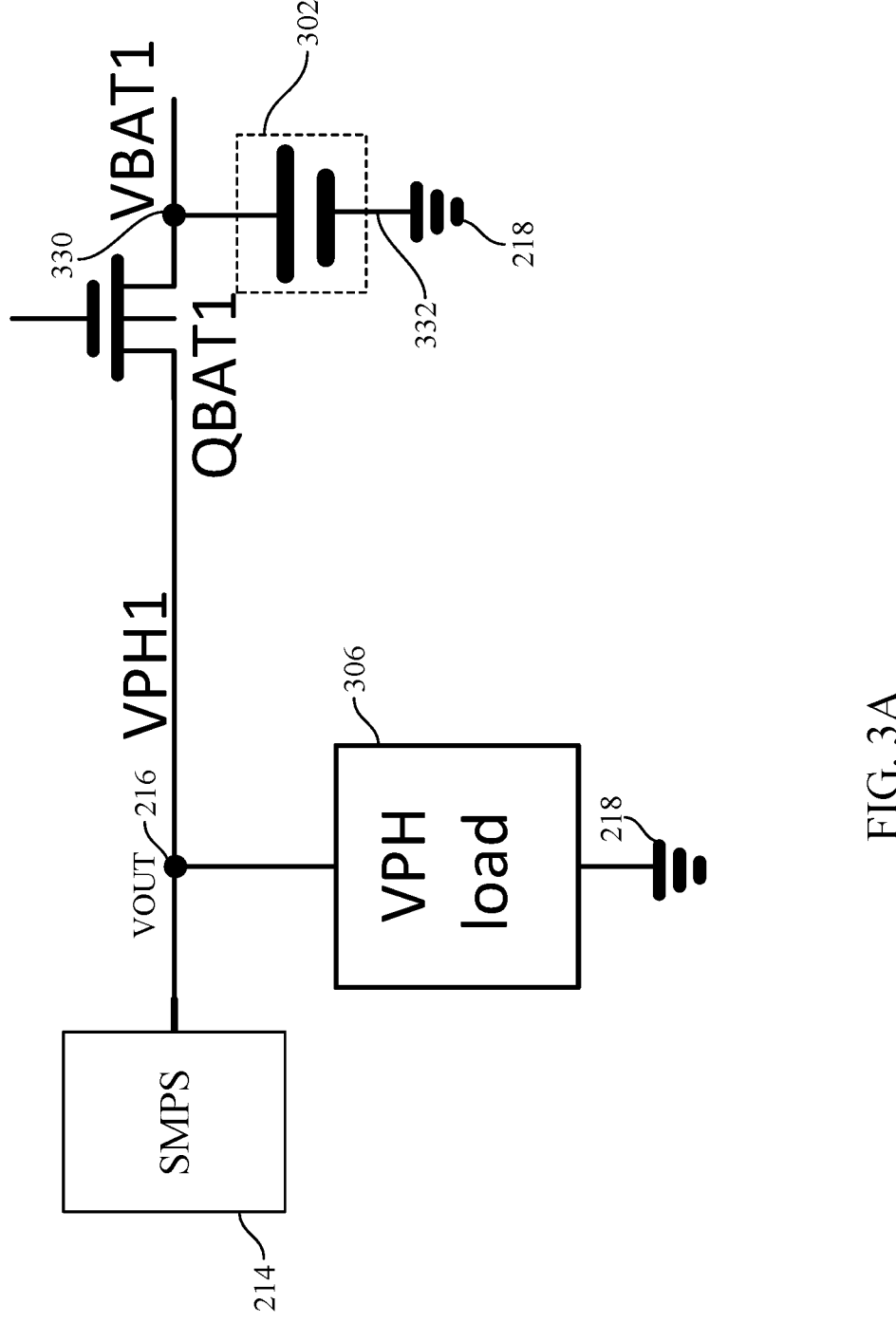
FIG. 3A is a circuit diagram of an example power supply circuit for a battery, in accordance with certain aspects of the present disclosure.

FIG. 3A is a circuit diagram of an example power supply circuit 300A, in accordance with certain aspects of the present disclosure. The power supply circuit 300A may include a switching regulator (e.g., the SMPS circuit 214), a first power supply node (labeled "VPH1"), a load 306 (e.g., labeled "VPH Load"), a first switch (e.g., implemented by one or more transistors QBAT1), and a first battery 302.

For certain aspects, the battery 302 may be external to an integrated circuit (IC) (e.g., a PMIC), whereas at least a portion of the SMPS circuit 214 and the first switch (implemented by transistor(s) QBAT1) may be internal to the IC. The battery 302 may represent a single-cell (1S) battery, a two-cell-in-series (2S) battery, or more than two stacked cells in a battery (e.g., a multi-cell-in series battery). The load 306 may be analogous to the load 210 of FIG. 2. The load 306 may represent one or more circuits of a device (e.g., the device 100 of FIG. 1) that are powered internally by the SMPS circuit 214 (e.g., with power supply node VPH1=VOUT) (e.g., when an external power source is provided to the power multiplexer 212) or by the battery 302 (e.g., when no external power source is available). The load 306 may be coupled (in shunt) to the reference potential node 218.

In certain aspects, the output voltage node 216 of the SMPS circuit 214 may be coupled to transistor(s) QBAT1 and the load 306. In certain aspects, transistor(s) QBAT1 may be a bidirectional switch implemented with one or more transistors. In some cases, transistor(s) QBAT1 may be implemented by back-to-back transistors or a body-switchable transistor, for example. The gate(s) of transistor(s) QBAT1 may be driven by logic circuitry (e.g., the control logic 201 of FIG. 2 or other logic not shown in FIG. 3A).

Transistor(s) QBAT1 may be coupled to the battery 302 via a first battery node 330 (labeled "VBAT1").

When the battery 302 is external to an IC with other circuitry of the power supply circuit 300A, the IC may include a positive first battery port (e.g., a pin) coupled to the battery node 330 and to the positive terminal of the battery 302. In some cases, the IC may include a negative first battery port coupled to another battery node 332 and to the negative terminal of the battery 302. The other battery node 332 may be coupled to the reference potential node 218.

According to certain aspects, the power supply circuit 300A may perform charging (via the SMPS circuit 214) of the battery 302. Electrical power received from a wall adapter or wireless charger, for example, at the power multiplexer 212 (illustrated in FIG. 2) may be converted by the SMPS circuit 214 and used to independently charge the battery 302. For example, current from the output voltage node 216 may be routed to the battery node 330 via transistor(s) QBAT1 for charging the battery 302.

In power supply circuits, the term "soft start" generally refers to an initial bring-up of a voltage in a slow and controlled manner, for example, to avoid an initial in-rush current to the bypass capacitors when turning on a device, switching power sources, etc. As used herein, a soft start may refer to a phase during which one or more associated transistors (e.g., transistor(s) QBAT1 for the battery 302) are biased in a linear region of operation before the transistors are fully turned on (e.g., biased in saturation). Soft start may be performed to charge a capacitive element (e.g., the bypass capacitor(s) on a power supply rail) to a voltage that is within a certain threshold of the battery voltage before the associated transistor for the battery is fully turned on, as described in more detail herein.

Many power supply circuits used in portable devices may utilize short circuit protection. For example, a power supply circuit (e.g., power supply circuit 300A) may provide short circuit protection during the initial power up of a power supply rail (e.g., the power supply node VPH1) by a SMPS circuit (e.g., SMPS circuit 214), which may involve turning off or disabling the SMPS circuit when a voltage at the power supply rail is less than a certain threshold (e.g., 2 V). In another example, short circuit protection may be provided during the initial power up of the power supply rail by a battery (e.g., battery 302) and may involve entering an automatic fault protection (AFP) mode when a voltage of the power supply rail does not reach a voltage at the battery. However, power supply circuits often lack any short circuit protection after the completion of a soft start of the voltage of the power supply rail. Any occurrence of a short circuit after the completion of a soft start may result in damage to the power supply circuit.

Accordingly, certain aspects of the present disclosure provide techniques and apparatus for selectively triggering an AFP mode after completion of a soft start of a voltage on a power supply node included in a power supply circuit. For example, after completion of a soft start of a voltage of a power supply node, an AFP mode may be triggered when the voltage of the power supply node is less than a threshold voltage ($V_{th}$) of a transistor. Certain aspects described herein for providing short circuit protection may consume minimal current and may function even when the power supply circuit is in a shutdown (e.g., low power) mode.

Example Power Supply Circuit with Short Circuit Protection

Figure 3B:
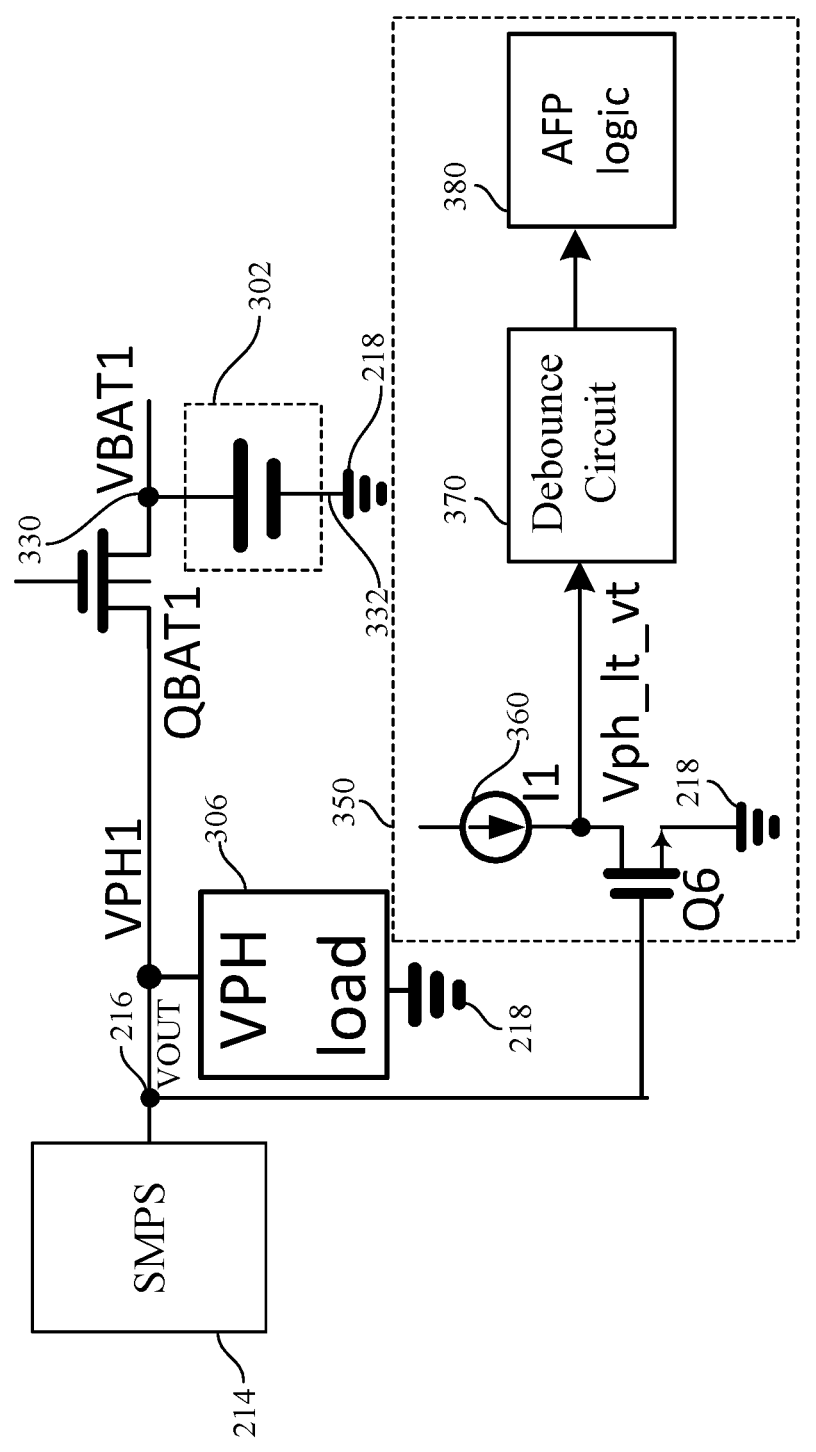
FIG. 3B is a circuit diagram of an example power supply circuit that includes short circuit protection for a power supply node, in accordance with certain aspects of the present disclosure.

FIG. 3B is a circuit diagram of an example power supply circuit 300B that includes short circuit protection, in accordance with certain aspects of the present disclosure. The power supply circuit 300B may be similar to the power supply circuit 300A of FIG. 3A, but also includes a logic circuit 350. For example, and as shown in FIG. 3B, the logic circuit 350 may include a transistor Q6, a first current source 360 (labeled "I1"), a debounce circuit 370, and automatic fault protection (AFP) logic 380.

The output voltage node 216 may be coupled to a gate of transistor Q6. Transistor Q6 may include a source coupled to the reference potential node 218 and a drain coupled to a first terminal of the current source 360 and the debounce circuit 370. The debounce circuit 370 may also be coupled to the AFP logic 380 and may be configured to debounce signals (e.g., ringing or bouncing signals due to a sudden voltage level transition) from transistor Q6. The debounce may last, for example, about 10 microseconds (μs). Transistor Q6 may be implemented as an n-type field-effect transistor. In certain aspects, the current source 360 may be replaced by a resistive element (e.g., a relatively high resistance resistor, not shown). In some cases, the current source 360 may generate 0.5 microamperes (μA) of current.

The logic circuit 350 may be configured to detect a short circuit on the power supply node VPH1 (e.g., using a signal labeled "vph1_lt_vt" at the drain of transistor Q6), after completion of a soft start of a voltage on the power supply node VPH1. With the topology of the logic circuit 350 illustrated in FIG. 3B, a short circuit is detected when the voltage of the power supply node VPH1 is less than a threshold voltage ($V_{th}$) of transistor Q6. In response to the detection of the short circuit on the power supply node, the logic circuit 350 may be configured to trigger an AFP mode. In some case, in response to the AFP mode being triggered, the logic circuit 350 may be configured to cause transistor(s) QBAT1 to open. In this manner, the AFP mode may prevent damage to transistor(s) QBAT1. The logic circuit 350 may be configured to ignore the voltage of the power supply node VPH1 being less than the threshold voltage of transistor Q6 (e.g., to ignore the vph1_lt_vt signal) before and during the soft start of the voltage of the power supply node VPH1.

The power supply circuit 300B may also be configured to provide short circuit protection as described herein when the battery 302 is dead or when electrical power is received from a wall adapter or wireless charger, for example, and provided through SMPS circuit 214, as well as when a short circuit occurs on the battery node 330 and transistor(s) QBAT1 are turned on.

Example Power Supply Circuit with Multiple Batteries

Although FIGS. 3A and 3B illustrate power supply circuits supporting a single battery, other power supply circuits may support multiple independent batteries (e.g., any number m of cells in series per battery and any number n of batteries in parallel (mSnP), such as one cell per battery and any multiple number n of batteries in parallel (1SnP), regardless whether the batteries have different capacities and/or cells in series).

Figure 4A:
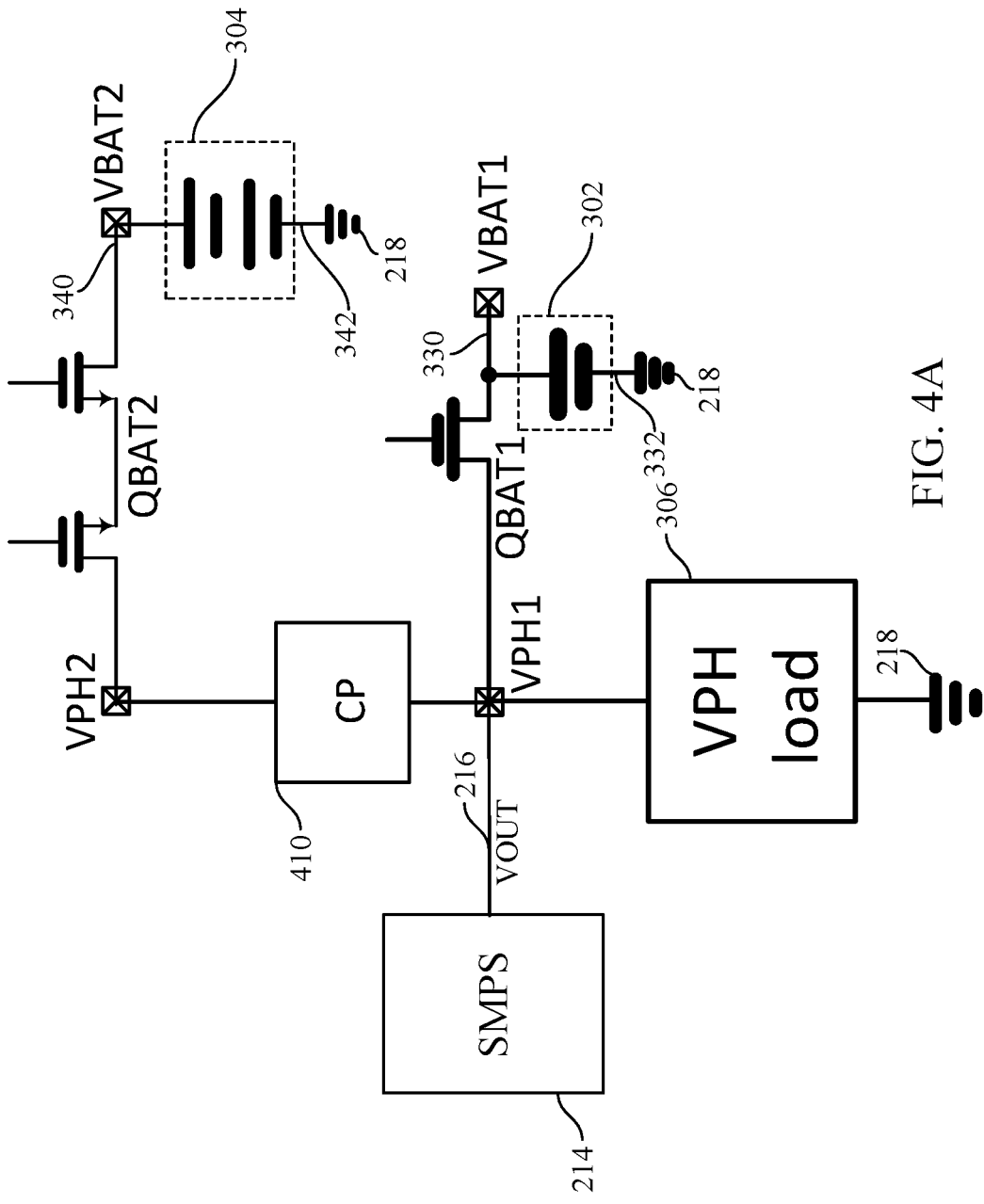
FIG. 4A is a circuit diagram of an example power supply circuit for multiple batteries, in accordance with certain aspects of the present disclosure.

FIG. 4A is a circuit diagram of an example power supply circuit 400A capable of supporting two (or more) batteries, in accordance with certain aspects of the present disclosure. The power supply circuit 400A may be similar to the power supply circuit 300A of FIG. 3A, but also includes a second power supply node (labeled "VPH2"), a second switch (e.g., implemented by one or more transistors QBAT2), a second battery 304, and a charge pump (CP) 410.

For certain aspects, the second battery 304 may be external to an integrated circuit (IC) (e.g., a PMIC), whereas at least a portion of the SMPS circuit 214, the CP 410, and the second switch (implemented by transistor(s) QBAT2) may be internal to the IC.

In certain aspects, each of the first battery 302 and/or the second battery 304 may represent a single-cell (1S) battery, a two-cell-in-series (2S) battery, or more than two stacked cells in a battery (e.g., a multi-cell-in series battery). The example architecture illustrated in FIG. 4A represents a 2P configuration, with two batteries in parallel, where the first battery 302 is a lower-cell battery (e.g., a 1S battery) and the second battery 304 is a higher-cell battery (e.g., a 2S, 3S, or 4S battery). In other words, the first battery 302 and the second battery 304 may be asymmetrical batteries, each with a different capacity (and size). For example, the power supply circuit 400A may be included in a device that is foldable, which may include a first portion coupled to a second portion by a hinge. In this example, the first portion of the foldable device may include the first battery 302, and the second portion of the foldable device may include the second battery 304.

In certain aspects, the output voltage node 216 of the SMPS circuit 214 may be coupled to transistor(s) QBAT2, in addition to transistor(s) QBAT1 and the load 306. In certain aspects, transistor(s) QBAT2 may be a bidirectional switch, implemented with one or more transistors. In some cases, transistor QBAT2 may be implemented by back-to-back transistors or a body-switchable transistor, for example. The gate(s) of transistor(s) QBAT2 may be driven by logic circuitry (e.g., the control logic 201 of FIG. 2 or other logic not shown in FIG. 4A). In certain aspects, transistor(s) QBAT2 may be coupled to the second battery 304 via a second battery node 340 (labeled "VBAT2").

When the second battery 304 is external to an IC with other circuitry of the power supply circuit 400A, the IC may include a positive second battery port (e.g., a pin) coupled to the battery node 340 and to the positive terminal of the second battery 304. In some cases, the IC may include a negative second battery port coupled to another second battery voltage node 342 and to the negative terminal of the second battery 304. The second battery voltage node 342 may be coupled to the reference potential node 218, as shown.

The CP 410 may have a first terminal coupled to the power supply node VPH1 and a second terminal coupled to the power supply node VPH2. The CP 410 may be implemented as an ×2 charge pump, a multiply-by-four (×4) charge pump, a Div2 charge pump, a Div4 charge pump, or a charge pump with any other suitable voltage conversion. In a first direction, the CP 410 may be configured to generate the voltage at the power supply node VPH2 from the voltage at the power supply node VPH1 (e.g., to charge the second battery 304 and/or provide power to the power supply node VPH2). In a second direction, the CP 410 may be configured to generate the voltage at the power supply node VPH1 from the voltage at the power supply node VPH2 and supply the load 306. For example, the CP 410 may multiply voltage in the first direction (e.g., operate as an ×2, ×4, or other charge pump when being powered from a wall adapter or wireless charger through the SMPS circuit 214), and may divide voltage in the second direction (e.g., operate as a Div2, Div4, or other charge pump when being powered by the second battery 304), or vice versa for power supply circuits with other battery configurations. In some aspects, the power supply node VPH2 has a higher voltage than the power supply node VPH1. For example, the CP 410 may double the voltage at the power supply node VPH1 to generate the voltage at the power supply node VPH2, to enable the power supply circuit 400A to supply both a power supply rail in a relatively low voltage domain (e.g., associated with the power supply node VPH1) and a power supply rail in a relatively high voltage domain (e.g., associated with the power supply node VPH2).

Example Power Supply Circuit with Multiple Batteries and Short Circuit Protection The aspects described herein for providing short circuit protection may be used in power supply circuits with multiple power supply nodes, as described below.

Figure 4B:
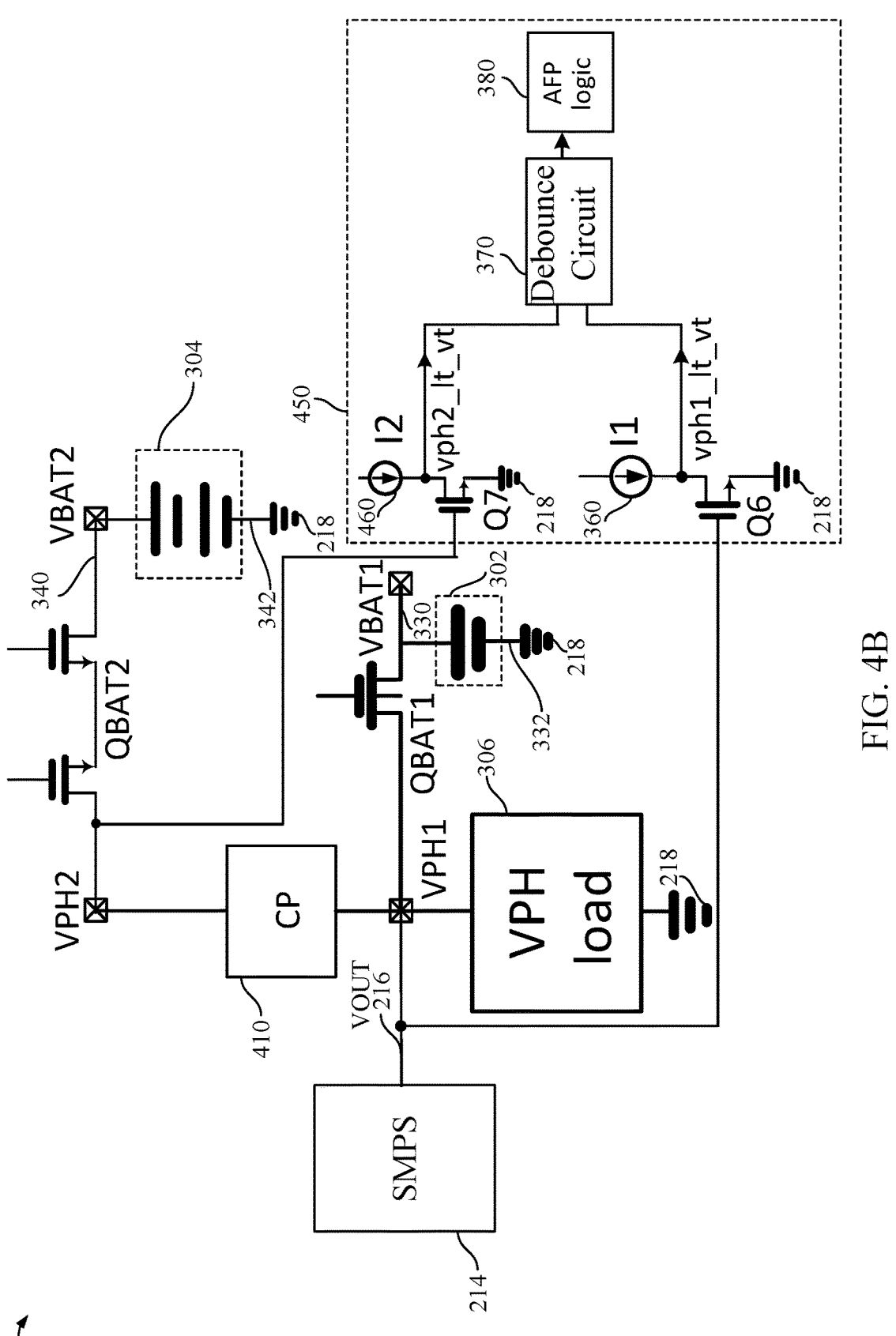
FIG. 4B is a circuit diagram of an example power supply circuit that includes short circuit protection for multiple power supply nodes, in accordance with certain aspects of the present disclosure.

FIG. 4B is a circuit diagram of an example power supply circuit 400B capable of supporting two (or more) batteries that includes short circuit protection, in accordance with certain aspects of the present disclosure.

The power supply circuit 400B may be similar to the power supply circuit 400A of FIG. 3A, but also includes a logic circuit 450. The logic circuit 450 may be similar to the logic circuit 350, but also includes a transistor Q7 and a second current source 460 (labeled "I2"). In some cases, the current source 460 may generate, for example, about 0.5 microamperes (μA) of current. In certain aspects, the current source 460 may generate the same amount of current as the current source 360.

The power supply node VPH2 may be coupled to a gate of transistor Q7. Transistor Q7 may include a source coupled to the reference potential node 218 and a drain coupled to a first terminal of the current source 460 and the debounce circuit 370. As described above, the debounce circuit 370 may also be coupled to the AFP logic 380, and may be configured to debounce signals from transistor Q6 and/or transistor Q7. The debounce may last, for example, about 10 μs. Transistor Q7 may be implemented as an n-type field-effect transistor. In certain aspects, the current source 460 may be replaced by a resistive element (e.g., a relatively high resistance resistor, not shown).

The logic circuit 450 may be configured to detect a short circuit on the power supply node VPH1 or the power supply node VPH2 (e.g., using the vph1_lt_vt signal and the signal labeled "vph2_lt_vt" from the drain of transistor Q7), after completion of a soft start of both a voltage on the power supply node VPH1 and a voltage on the power supply node VPH2. A short circuit is detected when the voltage of the power supply node VPH1 is less than a $V_{th}$ of transistor Q6 or when the voltage at the power supply node VPH2 is less than a $V_{th}$ of transistor Q7.

After completion of a soft start of a voltage at the power supply node VPH1 and a voltage of the power supply node VPH2, an AFP mode is configured to be triggered (e.g., by the AFP logic 380) when the voltage at the power supply node VPH1 is less than a $V_{th}$ of transistor Q6 or when the voltage at the power supply node VPH2 is less than a $V_{th}$ of transistor Q7. In response to the AFP mode being triggered, the logic circuit 450 may be configured to cause at least one of transistor(s) QBAT1 or transistor(s) QBAT2 to open. In this manner, the AFP mode may prevent damage to transistor(s) QBAT1 and/or transistor(s) QBAT2. The logic circuit 450 may be configured to ignore the voltage of the power supply node VPH1 being less than the $V_{th}$ of transistor Q6 and the voltage of the power supply node VPH2 being less than the $V_{th}$ of transistor Q7 before and during the soft start of the voltage of the power supply node VPH1 and the soft start of the voltage of the power supply node VPH2.

The power supply circuit 400B may also be configured to provide short circuit protection as described herein when the batteries 302, 304 are dead or when electrical power is received from a wall adapter or wireless charger, for example, and provided through the SMPS circuit 214 (and the CP 410), as well as when a short circuit occurs on the battery node 330 or the battery node 340 and the first switch (implemented by transistor(s) QBAT1) or the second switch (implemented by transistor(s) QBAT2), respectively, is turned on.

Example Operations for Supplying Power with Short Circuit Protection

FIG. 5 is a flow diagram of example operations 500 for supplying power, in accordance with certain aspects of the present disclosure. The operations 500 may be performed by a power supply circuit (e.g., the power supply circuit 300B, 400B of FIGS. 3B and 4B, respectively).

The operations 500 may include, at block 502, enabling a detection mode. The detection mode may be enabled after completion of a soft start of a voltage of a first power supply node (e.g., power supply node VPH1 or power supply node VPH2) coupled to an output (e.g., output voltage node 216) of a switching regulator (e.g., the SMPS circuit 214) and coupled to a battery node (e.g., battery node 330 or battery node 340) via a switch (e.g., transistor QBAT1 or transistor QBAT2). In certain aspects, enabling the detection mode may include enabling the detection mode after the completion of the soft start of the voltage of the first power supply node and after completion of a soft start of a voltage of a second power supply node (e.g., power supply node VPH2 or power supply node VPH1). In these aspects, a charge pump (e.g., CP 410) may be coupled between the second power supply node and the first power supply node, and the switch may be coupled between the second power supply node and the battery node.

At block 504, the operations 500 may involve triggering an AFP mode. The AFP mode may be triggered when, during the enabled detection mode, the voltage of the first power supply node is less than a $V_{th}$ of a first transistor (e.g., transistor Q6 or transistor Q7) including a gate coupled to the first power supply node. In certain aspects, triggering the AFP mode may include triggering the AFP mode when, during the detection mode, the voltage at the first power supply node is less than the $V_{th}$ of the first transistor or when the voltage at the second power supply node is less than a $V_{th}$ of a second transistor (e.g., transistor Q7 or transistor Q6) including a gate coupled to the second power supply node.

According to certain aspects, the operations 500 may further include performing debouncing of a transition of the first transistor before the triggering of the AFP mode. The debouncing may be performed by a debounce circuit (e.g., debounce circuit 370).

According to certain aspects, the operations 500 may further include ignoring the voltage of the first power supply node being less than the threshold voltage of the first transistor before the detection mode is enabled.

According to certain aspects, the operations 500 may further include opening the switch in response to the triggering of the AFP mode.

EXAMPLE ASPECTS

In addition to the various aspects described above, specific combinations of aspects are within the scope of the disclosure, some of which are detailed below:

Aspect 1: A power supply circuit comprising: a switching regulator including an output coupled to a first power supply node; a battery node for coupling to a battery; a switch coupled between the first power supply node and the battery node; a first transistor including a gate coupled to the first power supply node and a source coupled to a reference potential node of the power supply circuit; and a first current source or a resistive element, coupled between a power supply rail and a drain of the first transistor.

Aspect 2: The power supply circuit of Aspect 1, wherein after completion of a soft start of a voltage of the first power supply node, an automatic fault protection (AFP) mode is configured to be triggered when the voltage of the first power supply node is less than a threshold voltage of the first transistor.

Aspect 3: The power supply circuit of Aspect 2, wherein the voltage of the first power supply node being less than the threshold voltage of the first transistor is configured to be ignored before and during the soft start of the voltage of the first power supply node.

Aspect 4: The power supply circuit of Aspect 2 or 3, wherein the switch is configured to be open in response to the AFP mode being triggered.

Aspect 5: The power supply circuit according to any of Aspects 1-4, further comprising a debounce circuit coupled to the drain of the first transistor.

Aspect 6: The power supply circuit according to any of Aspects 1-5, wherein the first transistor comprises an n-type field-effect transistor.

Aspect 7: The power supply circuit according to any of Aspects 1-6, further comprising: a charge pump including a first terminal coupled to the first power supply node and including a second terminal coupled to a second power supply node, wherein the switch is coupled between the second power supply node and the battery node; a second transistor including a gate coupled to the second power supply node and a source coupled to the reference potential node; and a second current source coupled between the power supply rail and a drain of the second transistor.

Aspect 8: The power supply circuit of Aspect 7, wherein after completion of a soft start of a voltage at the first power supply node and a voltage of the second power supply node, an automatic fault protection (AFP) mode is configured to be triggered when the voltage at the first power supply node is less than a threshold voltage ($V_{th}$) of the first transistor or when the voltage at the second power supply node is less than a $V_{th}$ of the second transistor.

Aspect 9: The power supply circuit of Aspect 8, wherein the switch is configured to be open in response to the AFP mode being triggered.

Aspect 10: The power supply circuit according to any of Aspects 7-9, wherein the second transistor comprises an n-type field-effect transistor.

Aspect 11: An integrated circuit (IC) for power management, the IC comprising the power supply circuit according to any of Aspects 1-10.

Aspect 12: A power supply circuit comprising: a switching regulator including an output coupled to a power supply node; a battery node for coupling to a battery; a switch coupled between the power supply node and the battery node; and a logic circuit coupled to the power supply node and configured to detect a short circuit on the power supply node, after completion of a soft start of a voltage on the power supply node.

Aspect 13: The power supply circuit of Aspect 12, wherein: in response to the detection of the short circuit on the power supply node, the logic circuit is configured to trigger an automatic fault protection (AFP) mode; and in response to the AFP mode being triggered, the logic circuit is configured to cause the switch to open.

Aspect 14: An integrated circuit (IC) for power management, the IC comprising the power supply circuit of Aspect 12 or 13.

Aspect 15: A method of supplying power, the method comprising: after completion of a soft start of a voltage of a first power supply node coupled to an output of a switching regulator and coupled to a battery node via a switch, enabling a detection mode; and when, during the enabled detection mode, the voltage of the first power supply node is less than a threshold voltage ($V_{th}$) of a first transistor including a gate coupled to the first power supply node, triggering an automatic fault protection (AFP) mode.

Aspect 16: The method of Aspect 15, further comprising performing debouncing of a transition of the first transistor before the triggering of the AFP mode.

Aspect 17: The method of Aspect 15 or 16, further comprising ignoring the voltage of the first power supply node being less than the threshold voltage of the first transistor before the detection mode is enabled.

Aspect 18: The method according to any of Aspects 15-17, further comprising opening the switch in response to the triggering of the AFP mode.

Aspect 19: The method according to any of Aspects 15-18, wherein: enabling the detection mode comprises enabling the detection mode after the completion of the soft start of the voltage of the first power supply node and after completion of a soft start of a voltage of a second power supply node; a charge pump is coupled between the second power supply node and the first power supply node; and the switch is coupled between the second power supply node and the battery node.

Aspect 20: The method of Aspect 19, wherein triggering the AFP mode comprises triggering the AFP mode when, during the detection mode, the voltage at the first power supply node is less than the $V_{th}$ of the first transistor or when the voltage at the second power supply node is less than a $V_{th}$ of a second transistor including a gate coupled to the second power supply node.

ADDITIONAL CONSIDERATIONS

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A power supply circuit comprising:
a switching regulator including an output coupled to a first power supply node;
a battery node for coupling to a battery;
a switch coupled between the first power supply node and the battery node;
a first transistor including a gate coupled to the first power supply node and a source coupled to a reference potential node of the power supply circuit;
a first current source or a resistive element, coupled between a power supply rail and a drain of the first transistor; and
a debounce circuit coupled to the drain of the first transistor.

2. The power supply circuit of claim 1, wherein the first transistor comprises an n-type field-effect transistor.

3. An integrated circuit (IC) for power management, the IC comprising the power supply circuit of claim 1.

4. A power supply circuit comprising:
a switching regulator including an output coupled to a first power supply node;
a battery node for coupling to a battery;
a switch coupled between the first power supply node and the battery node;
a first transistor including a gate coupled to the first power supply node and a source coupled to a reference potential node of the power supply circuit; and
a first current source or a resistive element, coupled between a power supply rail and a drain of the first transistor, wherein after completion of a soft start of a voltage of the first power supply node, an automatic fault protection (AFP) mode is configured to be triggered when the voltage of the first power supply node is less than a threshold voltage of the first transistor.

5. The power supply circuit of claim 4, wherein the voltage of the first power supply node being less than the threshold voltage of the first transistor is configured to be ignored before and during the soft start of the voltage of the first power supply node.

6. The power supply circuit of claim 4, wherein the switch is configured to be open in response to the AFP mode being triggered.

7. A power supply circuit comprising:
a switching regulator including an output coupled to a first power supply node;
a battery node for coupling to a battery;
a switch coupled between the first power supply node and the battery node;
a first transistor including a gate coupled to the first power supply node and a source coupled to a reference potential node of the power supply circuit;

a first current source or a resistive element, coupled between a power supply rail and a drain of the first transistor;
a charge pump including a first terminal coupled to the first power supply node and including a second terminal coupled to a second power supply node, wherein the switch is coupled between the second power supply node and the battery node;
a second transistor including a gate coupled to the second power supply node and a source coupled to the reference potential node; and
a second current source coupled between the power supply rail and a drain of the second transistor.

8. The power supply circuit of claim 7, wherein after completion of a soft start of a voltage at the first power supply node and a voltage of the second power supply node, an automatic fault protection (AFP) mode is configured to be triggered when the voltage at the first power supply node is less than a threshold voltage ($V_{th}$) of the first transistor or when the voltage at the second power supply node is less than a $V_{th}$ of the second transistor.

9. The power supply circuit of claim 8, wherein the switch is configured to be open in response to the AFP mode being triggered.

10. The power supply circuit of claim 7, wherein the second transistor comprises an n-type field-effect transistor.

11. A method of supplying power, the method comprising:
after completion of a soft start of a voltage of a first power supply node coupled to an output of a switching regulator and coupled to a battery node via a switch, enabling a detection mode; and
when, during the enabled detection mode, the voltage of the first power supply node is less than a threshold voltage ($V_{th}$) of a first transistor including a gate coupled to the first power supply node, triggering an automatic fault protection (AFP) mode.

12. The method of claim 11, further comprising performing debouncing of a transition of the first transistor before the triggering of the AFP mode.

13. The method of claim 11, further comprising ignoring the voltage of the first power supply node being less than the threshold voltage of the first transistor before the detection mode is enabled.

14. The method of claim 11, further comprising opening the switch in response to the triggering of the AFP mode.

15. The method of claim 11, wherein:
enabling the detection mode comprises enabling the detection mode after the completion of the soft start of the voltage of the first power supply node and after completion of a soft start of a voltage of a second power supply node;
a charge pump is coupled between the second power supply node and the first power supply node; and
the switch is coupled between the second power supply node and the battery node.

16. The method of claim 15, wherein triggering the AFP mode comprises triggering the AFP mode when, during the detection mode, the voltage at the first power supply node is less than the $V_{th}$ of the first transistor or when the voltage at the second power supply node is less than a $V_{th}$ of a second transistor including a gate coupled to the second power supply node.

* * * * *